July 31, 1945.  J. W. HOWLETT  2,380,695
MACHINE FOR CUTTING TUBULAR MEMBERS INTO RINGS
Filed Oct. 7, 1943   3 Sheets-Sheet 1
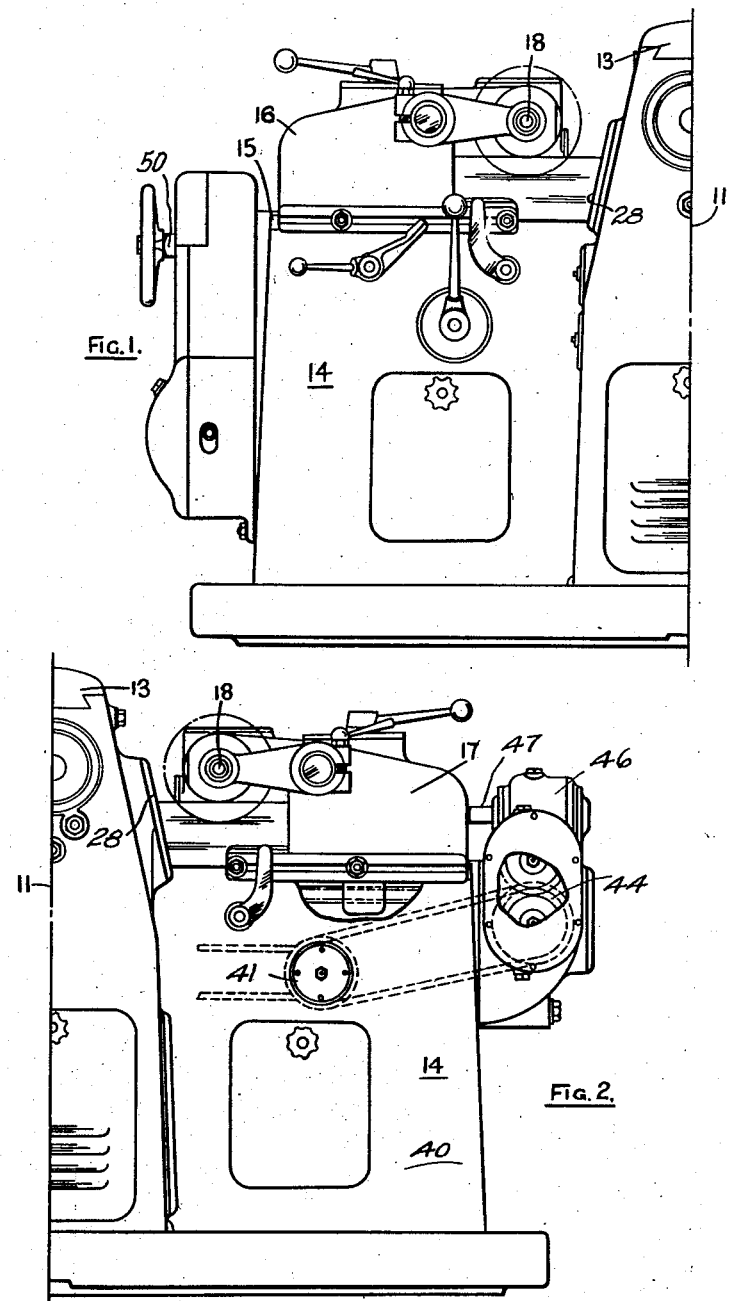
INVENTOR:
JOHN W. HOWLETT
BY Mawhinney & Mawhinney
ATTYS.

INVENTOR:
JOHN W. HOWLETT

July 31, 1945.  J. W. HOWLETT  2,380,695
MACHINE FOR CUTTING TUBULAR MEMBERS INTO RINGS
Filed Oct. 7, 1943   3 Sheets-Sheet 3

Inventor
John William Howlett
by Mawhinney & Mawhinney
Attorneys

Patented July 31, 1945

2,380,695

UNITED STATES PATENT OFFICE 2,380,695

MACHINE FOR CUTTING TUBULAR MEMBERS INTO RINGS

John William Howlett, London, England, assignor of one-half to Wellworthy Piston Rings Limited, London, England Application October 7, 1943, Serial No. 505,366
In Great Britain December 22, 1942

3 Claims. (Cl. 29—70)

This invention relates to a machine, for forming piston-rings, washers or other rings by cutting through a metal pot, cylinder or other tubular member in planes at right angles to its axis, of the kind including a rotatable spindle carrying a number of circular saws or other cutters spaced axially from one another dependently upon the width of the rings to be cut, and, parallel thereto, a second rotatable spindle for supporting the tubular member in contact with the cutters.

I have found that, if rings are formed in this way by hand-feeding, the intermittent feed motion tends to produce burrs on the finished rings at the inner and outer periphery or other slight irregularities. I have also attempted to produce rings in this way with initial feed only, by driving the spindle carrying the tubular member at a very low speed so that the member can be completely parted into rings in, say, one revolution, but this involves difficulties in adjustment if accuracy is to be continuously obtained. Conversely, driving the tubular member too quickly is also found to be unsatisfactory. I have also attempted to drive both the spindles through belts, but, due to the elasticity of belt drives, damage sometimes results to the saw-teeth as well as to the work.

It is my main object to provide an improved machine by which these disadvantages will be mainly or entirely avoided.

For a better understanding of this and other objects and advantages of the invention, attention should be directed to the following description in which reference is made to the accompanying drawings, wherein:

Figure 1 is a front elevation of the left half of a machine according to the invention, and Figure 2 is a front elevation of the right half thereof with part of the casing broken away to show the lead screw and nut and also gearing hereinafter referred to, the vertical centre line of the machine being marked 11 in the two figures;

According to the invention, the slide by which the second spindle is supported is operated by a lead screw and nut for feeding purposes, and both the spindles are finally driven through worm gears, the first spindle at a "cutter" speed of between 50 and 150 feet per minute and the second at a "member" speed of between 5 and 19 inches per minute, say, about 12 inches per minute, whilst the feed is between one-thirty-second and one-eighth of an inch per minute. At this relatively-low rate of feed it is not practical to operate with a hydraulic feed.

It is also known to provide a third spindle, for supporting a second metal tubular member, which is mounted on the other side of the first spindle, and, according to a further feature of the invention, the third spindle is driven and fed in a manner similar to that of the second spindle, and the second and third spindles are both driven at their ends remote from the end at which the first spindle is driven. The machine, in fact, may in substance be of T-shape in plan view—rather a thick, squat T—the head of the T being machined horizontally to receive the slides supporting the second and third spindles for movement towards or away from the first spindle which is aligned with the tail of the T.

Figure 4:
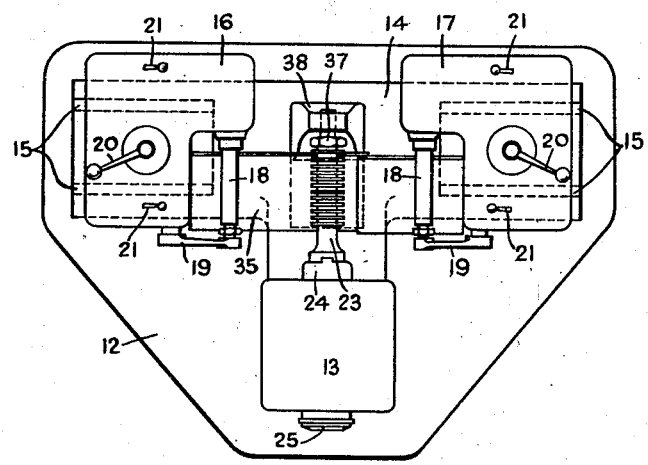
Figure 4 is a plan of the machine to a somewhat smaller scale.

Referring now to the drawings, it will be observed from Figure 4 that the machine itself is in substance shaped like a squat T, excepting for the base plate 12, the machine comprising a headstock 13 in front of a main body 14 which terminates at a lower level than the top of the headstock and is machined to provide aligned ways 15 in a horizontal plane for two slides 16 and 17. The slides are substantially similar, each supporting a spindle 18 adapted to carry one of the tubular members which is to be cut through, the end of the spindle being journalled in a bearing carried by a movable arm 19 as disclosed in the specification accompanying my co-pending patent application Serial No. 506,367 filed the 7th day of October, 1943. The arm 19 can be moved to an out-of-the-way position to allow of unloading and loading by a rack-and-pinion mechanism operable by a handle 20 after the clamping devices 21 have been released.

Figure 3:
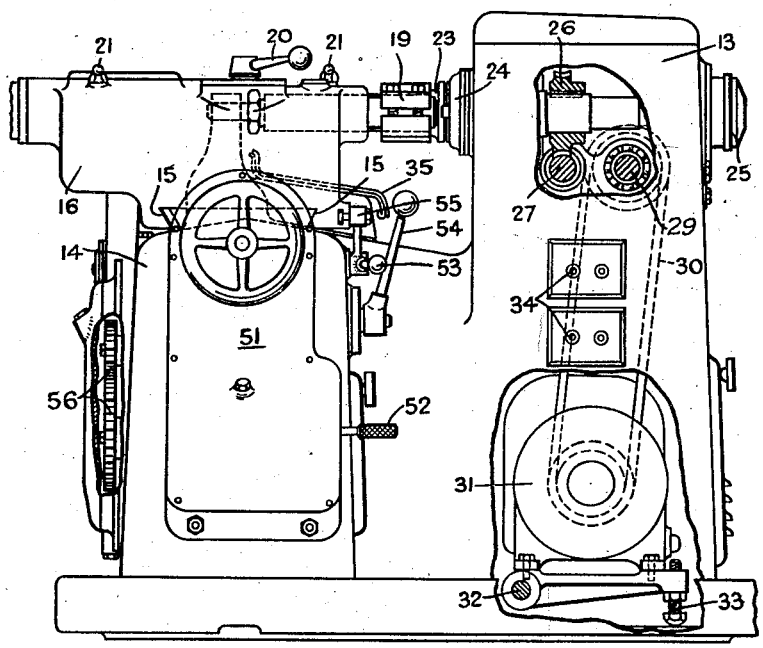
Figure 3 is an end elevation, with a part of the casing of the headstock broken away and part of the driving means for the cutter-carrying spindle shown in section, taken from the left of Figure 1.

The cutter-carrying spindle 23 is, in this case, separate from but in driving connection with the headstock spindle 24 (Figure 4), and it may be secured thereto in a manner known per se by an internal draw-bar device to which access is provided by removal of the cap 25. The manner in which the headstock spindle 24 can be driven is shown more particularly in Figure 3, where it has fast upon it a worm wheel 26 meshed with a worm 27, the worm shaft being connected by a pick-off gear pair (which is accessible upon removal of the cover plate 28) to a shaft 29, which in turn is driven through a belt 30 from an electric motor 31 therebeneath. The motor is pivotally mounted at 32 and movable about its pivotal mounting by adjustment means 33 for the purpose of tensioning the belt. Control buttons for the motor, and for another motor to be hereinafter described, are indicated at 34. A telescopic guard 35 protects the ways 15.

The spindle 23 upon which the cutters are mounted, being held in position with intervening spacers as by means of a nut 37 on the spindle, is journalled at its free end in a bearing in a bracket 38 supported from the main body 14 and preferably so as to be movable in a fore-and-aft direction of the machine, thus to facilitate the detachment of the spindle 23 if any of the cutters should require attention or replacement. The spindle 23, therefore, is supported at the back of the machine, whereas the spindles 18 are supported at the front of the machine.

In the right-hand half, 40, of the machine is disposed a second electric motor which is adjustably mounted in the manner previously described and which drives to a pulley shaft supported by the boss 41. A driven pulley thereon drives by a belt 42 to a layshaft 43 and thence through a pair of pick-off gears 44, accessible by removal of the cover 45, to a worm which is meshed with a worm-wheel within the stationary casing 46, the worm wheel being fast with a shaft 47 which runs through worms which are endwise located in the two slides 16 and 17, respectively, the shaft 47 having a sliding and driving connection with the worms in a manner known per se. The two worms mesh with worm wheels which are fast on the spindles 18.

Thus, all three spindles are finally driven through worm gearings and it is an easy matter to arrange for them to be driven at speeds within the ranges specified in the opening paragraphs of this specification, the use of pick-off gears allowing desired changes of speed to be made within the said ranges.

In the present instance each of the slides is fast with a nut 49 (shown only in Figure 2 for the slide 17) extending through a cored hole in the body 14 and engaged with a lead screw 50. Obviously, if there are separate lead screws for the slides they should be driven in unison. The lead screw 50 is driven through gearing in a casing 51 (Figure 1) at the left hand end of the machine incorporating worm gearing with a drop-out worm which can be lifted into mesh by a handle 52. The drop-out worm can be automatically released by a handle 53 which is fast with a stop arm 54 disposed to coact with an adjustable abutment 55 on the slide 16 in a known manner so as to ensure that the drop-out worm will be released, to stop the automatic feed, when the machining operation has been completed. The drive to the drop-out worm is by belt from a pick-off gear pair (shown at 56) and conveniently the drive to this gear pair is by belt 57 from a second driven pulley on the shaft supported by the boss 41. In particular, change-speed gearing may be added, and the drive therethrough to the lead screw may be as described in the specifications accompanying my co-pending patent applications Serial Nos. 505,368 and 505,369 filed the 7th day of October, 1943.

Figure 5:
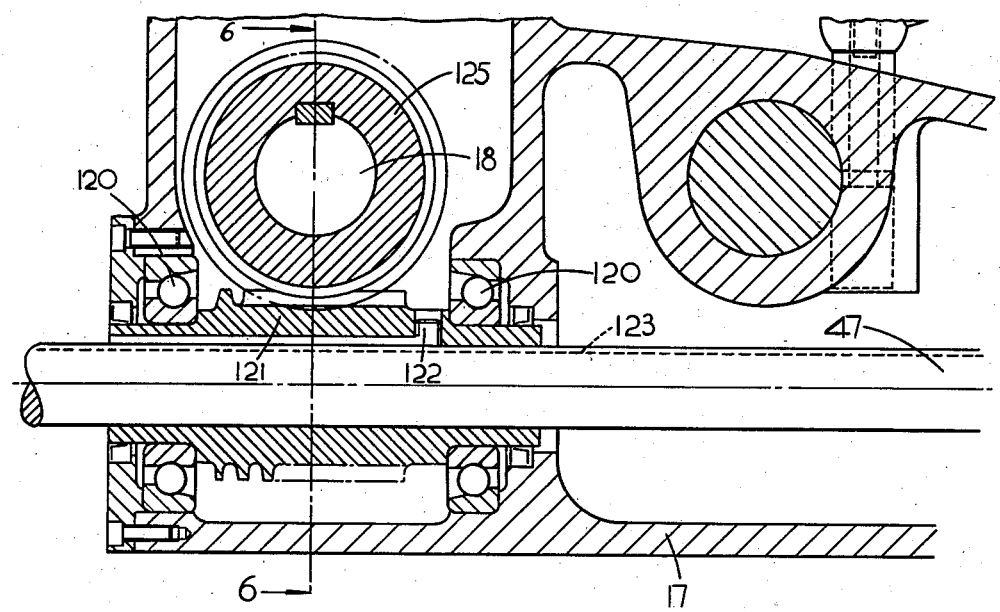
Figure 5 is a fragmentary sectional elevation, to a somewhat larger scale, corresponding to Figure 2, showing the final driving means for the associated work spindle.
Figure 6:
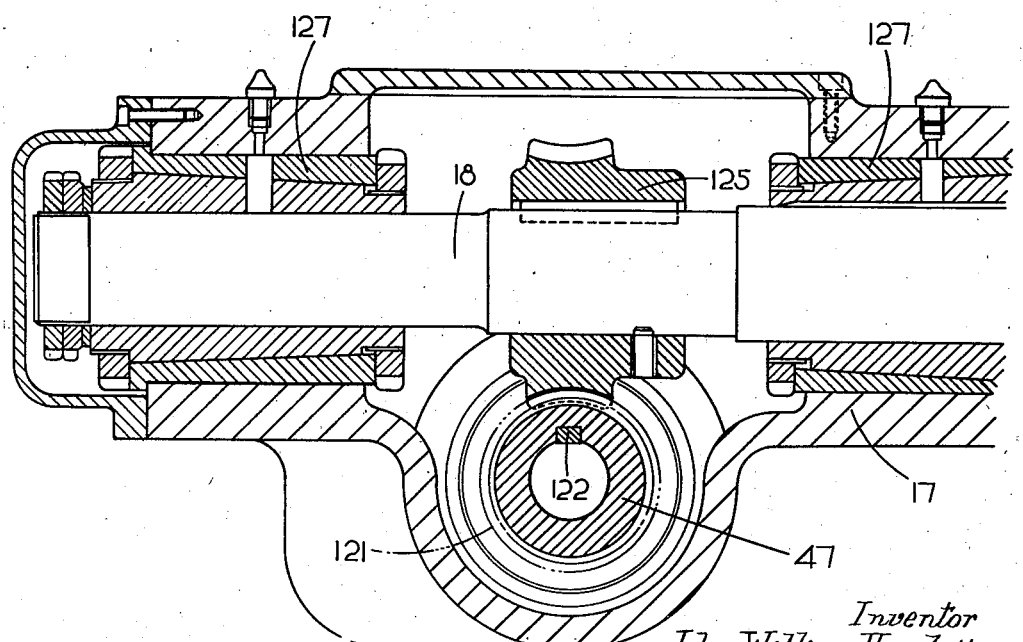
Figure 6 is a cross-section thereof on the line 6—6.

In Figures 5 and 7, the shaft 47 is shown passing through the right-hand slide 17, and, it will be understood, it extends right through to the left-hand slide 16, and the drives from the shaft 47 to the two work spindles are identical. As will be seen from Figure 5, the slide 17 carries in ball bearings 120 an endwise-located worm 121 which is fast with a key 122 having a sliding connection with a key-way slot 123 in the shaft 47 whereby movement of the slide in the direction of the axis of the shaft will carry with it the worm 121 whilst the latter remains in driving engagement with the shaft. The worm 121 is permanently in mesh with a worm wheel 125 which is fast upon the work spindle 18, being journalled in the slide in adjustable taper bearings 127, 127.

What I claim as my invention and desire to secure by Letters Patent of the United States is:

1. A machine for simultaneously cutting two tubular metal members into rings, including a rotatable spindle, axially-spaced circular cutters carried on said spindle, a pair of rotatable spindles, for respectively supporting the tubular members to be cut, supported parallel to the first spindle and on opposite sides thereof, slides by which the spindles of said pair are individually supported, a lead screw and nuts for operating said slides for feeding purposes, means for driving said lead screw to give a rate of feed between $\frac{1}{32}$ and $\frac{1}{8}$ of an inch per minute, worm gearings for driving all of said spindles, and means for driving said worm gearings such that the first spindle is driven at a "cutter" speed of between 50 and 150 feet per minute, and the other two at a "member" speed of between 5 and 19 inches per minute, the machine being in substance of T-shape in plan view, the head of the T being machined horizontally to receive said slides, and the first spindle being aligned with the tail of the T.

2. A machine for cutting metal tubular members into rings, including a rotatable spindle, a number of axially-spaced circular cutters to be carried on said spindle, other rotatable spindles on opposite sides respectively of the first spindle, for supporting the tubular members parallel to the first spindle, slides by which said other spindles are supported, lead screw and nut means for operating said slides for feeding purposes, and worm gearing through which all of said spindles are finally driven, said other spindles being driven at their ends remote from the end at which said first spindle is driven.

3. A machine according to claim 2 in which the worm gearing through which said other rotatable spindles are driven include worms which are axially fast in the respective slides and have a sliding and driving connection with a driving shaft.

JOHN WILLIAM HOWLETT.